US011153922B2

(12) United States Patent
Prasanna et al.

(10) Patent No.: US 11,153,922 B2
(45) Date of Patent: Oct. 19, 2021

(54) DIRECTIONAL WIRELESS COMMUNICATIONS ONBOARD AIRCRAFT

(71) Applicant: Rosemount Aerospace Inc., Burnsville, MN (US)

(72) Inventors: Ramamurthy Prasanna, Karnataka (IN); Mahadevanna Shreshthi, Karnataka (IN); Adishesha Chinknyakanhalli Sivaramasastry, Karnataka (IN)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 90 days.

(21) Appl. No.: 16/712,168

(22) Filed: Dec. 12, 2019

(65) Prior Publication Data
US 2021/0112613 A1 Apr. 15, 2021

(30) Foreign Application Priority Data
Oct. 15, 2019 (IN) .............................. 201911041775

(51) Int. Cl.
*H04W 76/15* (2018.01)
*H04B 17/318* (2015.01)
(Continued)

(52) U.S. Cl.
CPC ........ *H04W 76/15* (2018.02); *G06F 16/2379* (2019.01); *H04B 7/10* (2013.01);
(Continued)

(58) Field of Classification Search
CPC ..... H04W 76/15; H04W 76/30; H04W 24/08; H04W 28/06; H04W 52/367;
(Continued)

(56) References Cited

U.S. PATENT DOCUMENTS 7,120,468 B1 10/2006 Wilhoyte et al.
7,231,180 B2 6/2007 Benson et al.
(Continued)

FOREIGN PATENT DOCUMENTS

EP 0595440 B1 6/1999
EP 1806880 A1 7/2007
(Continued)

OTHER PUBLICATIONS

Partial European Search Report Issued in European Application No. 20202030.1-1205 dated Mar. 25, 2021; 15 Pages.
(Continued)

*Primary Examiner* — Peter P Chau
(74) *Attorney, Agent, or Firm* — Cantor Colburn LLP

(57) ABSTRACT

Disclosed is a method that includes receiving absolute wireless access point coordinates from wireless access points that define respective wireless access point positions of the wireless access points. The method includes orienting the directional antenna to orientations based on the absolute wireless access point coordinates. The method includes transmitting test signals to the respective wireless access points while the directional antenna is positioned at the orientations to generate the database entries associated with the respective wireless access point positions. The method includes orienting the directional antenna according to a first one of the database entries having a greatest likelihood to establish a first communications path between a first one of the wireless access points and the wireless endpoint. The method includes transmitting a data signal to the first one of the wireless access points with a minimum transmission power based on the database entries.

15 Claims, 7 Drawing Sheets

(51) Int. Cl.
  *H04W 76/30* (2018.01)
  *G06F 16/23* (2019.01)
  *H04B 7/10* (2017.01)
  *H04W 24/08* (2009.01)
  *H04W 28/06* (2009.01)
  *H04W 52/36* (2009.01)
  *H04W 64/00* (2009.01)
  *H04W 88/08* (2009.01)

(52) U.S. Cl.
  CPC .......... *H04B 17/318* (2015.01); *H04W 24/08* (2013.01); *H04W 28/06* (2013.01); *H04W 52/367* (2013.01); *H04W 64/00* (2013.01); *H04W 76/30* (2018.02); *H04W 88/08* (2013.01)

(58) Field of Classification Search
  CPC ..... H04W 64/00; H04W 88/08; H04W 16/28; H04B 17/318; H04B 7/10; H04B 7/088; H04B 7/18506; G06F 16/2379
  See application file for complete search history.

(56) References Cited

U.S. PATENT DOCUMENTS

| | | | |
|---|---|---|---|
| 8,352,392 | B2 | 1/2013 | Swift et al. |
| 8,374,601 | B2 | 2/2013 | Sadok et al. |
| 8,849,475 | B1 | 9/2014 | Sudolsky et al. |
| 9,578,095 | B2 | 2/2017 | Zavesky et al. |
| 9,628,365 | B2 | 4/2017 | Gelvin et al. |
| 9,918,109 | B2 | 3/2018 | Frisco et al. |
| 2003/0055938 | A1 | 3/2003 | Barzilai |
| 2004/0147287 | A1* | 7/2004 | Nelson, Jr. .......... H04W 52/143 455/561 |
| 2004/0176050 | A1 | 9/2004 | Steer et al. |
| 2007/0153802 | A1 | 7/2007 | Anke et al. |
| 2009/0138420 | A1 | 5/2009 | Swift et al. |
| 2011/0175791 | A1 | 7/2011 | Ozdemir et al. |
| 2011/0310768 | A1 | 12/2011 | Shin |
| 2012/0286935 | A1 | 11/2012 | Huang |
| 2013/0003620 | A1 | 1/2013 | Dame |
| 2015/0131616 | A1* | 5/2015 | Jo .................... H04W 36/00835 370/331 |
| 2015/0330869 | A1 | 11/2015 | Ziarno |
| 2016/0028608 | A1 | 1/2016 | Dasgupta et al. |
| 2016/0196527 | A1 | 7/2016 | Bose et al. |
| 2016/0234128 | A1 | 8/2016 | Robertson et al. |
| 2016/0269240 | A1 | 9/2016 | Balakrishnan et al. |
| 2017/0034277 | A1 | 2/2017 | Jackson et al. |
| 2018/0376367 | A1 | 12/2018 | Das et al. |

FOREIGN PATENT DOCUMENTS

| | | |
|---|---|---|
| EP | 1841148 A1 | 10/2007 |
| EP | 2874437 A1 | 5/2015 |
| EP | 2933931 A2 | 10/2015 |
| GB | 2505203 A | 2/2014 |
| WO | 2004025900 A2 | 3/2004 |
| WO | 2018060950 A1 | 4/2018 |

OTHER PUBLICATIONS

Extended European Search Report for European Application No. 18179344.9; Date of Completion: Oct. 4, 2018 dated Oct. 15, 2018; 10 Pages.

\* cited by examiner

| Wireless Endpoint ID | Wireless Access Point ID | Beam Orientation (Degree) | Transmit Power (dBm) | Polarization | Average RSSI (dBm) |
|---|---|---|---|---|---|
| 5 | C00 1 | 30 | 0 | Left | -42 |
| | | | | Right | -45 |
| | | | -5 | Left | -50 |
| | | | | Right | -52 |
| | | | -10 | Left | -60 |
| | | | | Right | -62 |
| | | 45 | | | |
| | | | | | |
| | | | | | |
| | | | | | |
| | | | | | |
| | | | | | |
| | ⋮ | | | | |
| | C00 N | 30 | | | |
| | | | | | |
| | | | | | |
| | | | | | |
| | | | | | |
| | | | | | |
| | | 45 | | | |
| | | | | | |
| | | | | | |
| | | | | | |
| | | | | | |

FIG. 7A

| Wireless Endpoint ID 752 | Wireless Access Point ID 754 | Beam Orientation (Degree) 756 | Transmit Power (dBm) 758 | Polarization 760 | Average RSSI (dBm) 762 |
|---|---|---|---|---|---|
| 1 | C001 (Primary WDC) | | | | |
| 1 | C002 (Secondary WDC) | | | | |
| 2 | C003 (Primary WDC) | | | | |
| 2 | C004 (Secondary WDC) | | | | |
| ... | | | | | |
| M | Primary WDC ID | | | | |
| M | Secondary WDC ID | | | | |

DIRECTIONAL WIRELESS COMMUNICATIONS ONBOARD AIRCRAFT

CROSS-REFERENCE TO RELATED APPLICATIONS

This application claims the benefit of Indian Patent Application Serial No. 201911041775 filed Oct. 15, 2019, the disclosure of which is incorporated herein by reference in its entirety.

BACKGROUND

The present disclosure relates to the art of wireless communications on aircraft. Passengers, operators and control systems may harness aircraft wireless communications to communicate onboard and offboard aircraft.

BRIEF DESCRIPTION

Disclosed is a method for initializing wireless communications in an aircraft by recording database entries for wireless communications in a database schema and positioning a directional antenna associated with a wireless endpoint according to the database entries. The method includes receiving absolute wireless access point coordinates from wireless access points that define respective wireless access point positions of the wireless access points. The method includes orienting the directional antenna to orientations based on the absolute wireless access point coordinates. The method includes transmitting test signals to the respective wireless access points while the directional antenna is positioned at the orientations to generate the database entries associated with the respective wireless access point positions. The method includes orienting the directional antenna according to a first one of the database entries having a greatest likelihood to establish a first communications path between a first one of the wireless access points and the wireless endpoint. The method includes transmitting a data signal to the first one of the wireless access points with a minimum transmission power based on the database entries.

In addition to one or more of the features described above, or as an alternative, further embodiments may include that responsive to a disconnection of the first communications path, orienting the directional antenna according to a second one of the database entries having a second greatest likelihood to establish a second communications path between a second one of the wireless access points and the wireless endpoint.

In addition to one or more of the features described above, or as an alternative, further embodiments may include wherein the disconnection of the first communications path includes a dropped packet associated with the first communications path.

In addition to one or more of the features described above, or as an alternative, further embodiments may include wherein the orienting the directional antenna of the wireless endpoint based on the absolute wireless access point coordinates is according to relative coordinates defined by the absolute wireless access point coordinates and absolute wireless endpoint coordinates that define a wireless endpoint position of the wireless endpoint.

In addition to one or more of the features described above, or as an alternative, further embodiments may include wherein the orientations are all positions within an offset band having a step size that corresponds with the relative coordinates.

In addition to one or more of the features described above, or as an alternative, further embodiments may include wherein the database entries are ratios of received signal strengths and transmission powers corresponding to the absolute wireless access point coordinates and the greatest likelihood is based on the ratios.

In addition to one or more of the features described above, or as an alternative, further embodiments may include wherein the directional antenna is an antenna apparatus that produces ratios according to the relative coordinates such that the ratios vary based on the relative coordinates.

In addition to one or more of the features described above, or as an alternative, further embodiments may include wherein the received signal strengths are received from the respective wireless access points as a data transmission.

In addition to one or more of the features described above, or as an alternative, further embodiments may include wherein the test signals are defined by combinations of transmission strength and polarization that vary at the orientations.

In addition to one or more of the features described above, or as an alternative, further embodiments may include wherein the database entries are further defined according to the polarization.

Also disclosed is a method for positioning a directional antenna associated with a wireless endpoint according to database entries. The method includes orienting the directional antenna according to a first one of the database entries having a greatest likelihood to establish a first communications path between a first one of wireless access points and the wireless endpoint.

In addition to one or more of the features described above, or as an alternative, further embodiments may include transmitting a data signal to the first one of the wireless access points with a minimum transmission power based on the database entries; and In addition to one or more of the features described above, or as an alternative, further embodiments may include responsive to a disconnection of the first communications path, orienting the directional antenna according to a second one of the database entries having a second greatest likelihood to establish a second communications path between a second one of the wireless access points and the wireless endpoint.

In addition to one or more of the features described above, or as an alternative, further embodiments may include wherein the database entries are defined by a method for initializing wireless communications in an aircraft by recording the database entries for wireless communications in a database schema comprising:

In addition to one or more of the features described above, or as an alternative, further embodiments may include that receiving absolute wireless access point coordinates from wireless access points that define respective wireless access point positions of the wireless access points;

In addition to one or more of the features described above, or as an alternative, further embodiments may include that orienting the directional antenna to orientations based on the absolute wireless access point coordinates; and In addition to one or more of the features described above, or as an alternative, further embodiments may include that transmitting test signals to the respective wireless access points while the directional antenna is positioned at the orientations to generate the database entries associated with the respective wireless access point positions.

In addition to one or more of the features described above, or as an alternative, further embodiments may include wherein the disconnection of the first communications path includes a dropped packet associated with the first communications path.

In addition to one or more of the features described above, or as an alternative, further embodiments may include wherein the database entries are ratios of received signal strengths and transmission powers corresponding to absolute wireless access point coordinates and the greatest likelihood is based on the ratios.

In addition to one or more of the features described above, or as an alternative, further embodiments may include wherein the directional antenna is an antenna apparatus that produces ratios according to the absolute wireless access point coordinates such that the ratios vary based on the absolute wireless access point coordinates.

In addition to one or more of the features described above, or as an alternative, further embodiments may include wherein the received signal strengths are received from the respective wireless access points as a data transmission.

Also disclosed is a controller program product operable to enable orientation of a directional antenna associated with a wireless endpoint on an aircraft. The controller program product includes digital storage including database entries associated with a database schema corresponding to connection likelihoods between the wireless endpoint and wireless access points. The computer program product includes controller instructions stored on the digital storage operable upon execution by a controller of the wireless endpoint to orient the directional antenna according to a first one of the database entries having a greatest likelihood to establish a first communications path between a first one of wireless access points and the wireless endpoint and transmit a data signal to the first one of the wireless access points with a minimum transmission power defined in the first one of the database entries, the controller instructions further operable upon execution by the controller to responsive to a disconnection of the first communications path, orienting the directional antenna according to a second one of the database entries having a second greatest likelihood to establish a second communications path between a second one of the wireless access points and the wireless endpoint.

In addition to one or more of the features described above, or as an alternative, further embodiments may include wherein the disconnection of the first communications path includes a dropped packet associated with the first communications path.

In addition to one or more of the features described above, or as an alternative, further embodiments may include wherein the database entries are ratios of received signal strengths and transmission powers corresponding to absolute wireless access point coordinates and the greatest likelihood is based on the ratios.

In addition to one or more of the features described above, or as an alternative, further embodiments may include wherein the directional antenna is an antenna apparatus that produces ratios according to the absolute wireless access point coordinates such that the ratios vary based on the absolute wireless access point coordinates.

BRIEF DESCRIPTION OF THE DRAWINGS

The following descriptions should not be considered limiting in any way. With reference to the accompanying drawings:

FIG. 7A illustrates a database schema for recording test signal results; and

FIG. 7B illustrates a database schema for recording highest likelihood connections.

DETAILED DESCRIPTION

A detailed description of one or more embodiments of the disclosed apparatus and method are presented herein by way of exemplification and not limitation with reference to the Figures.

Figure 1:
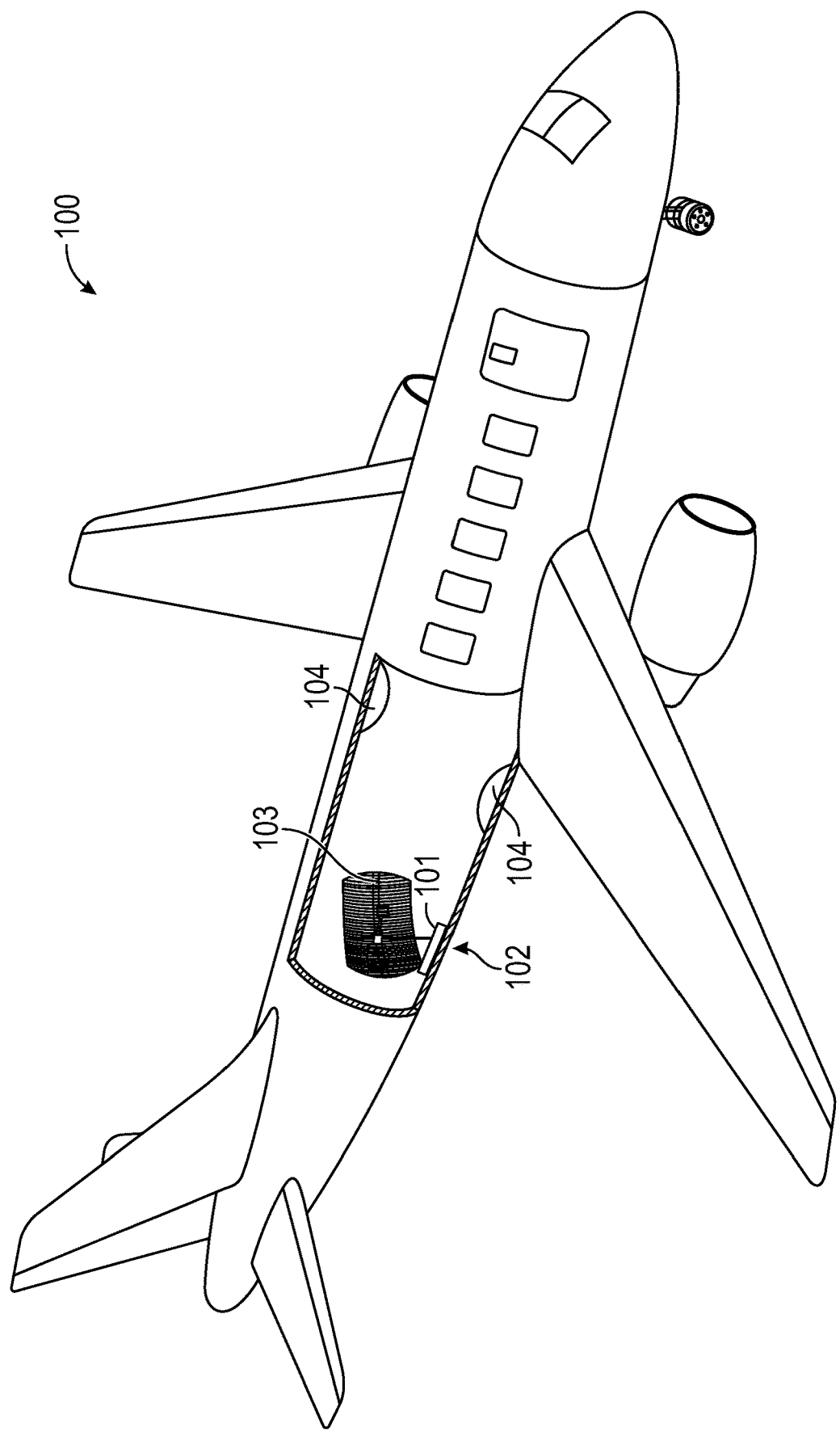
FIG. 1 illustrates an example an aircraft having wireless communications apparatuses disposed therein.

Looking to FIG. 1, a portion of an aircraft 100 is shown in accordance with one or more implementations of the present disclosure. The aircraft 100 includes a wireless endpoint 102. The aircraft 100 may house numerous wireless endpoints 102 for a variety of functions. As one of many possible uses, the wireless endpoint 102 may be connected to sensory inputs (e.g., temperature, pressure, force) related to any number of operational inputs. The wireless endpoint 102 may provide passenger or cargo communications. As shown, the wireless endpoint 102 includes a directional antenna 103 and a controller 101. The wireless endpoint 102 may be battery powered or powered by aircraft power system. The wireless endpoint 102 may be associated with any number of wireless access points 104. The directional antenna 103 may be an antenna apparatus configured to direct electromagnetic waves that have different transmission characteristics (e.g., RSSI) that vary based on the orientation of the antenna apparatus. The wireless access points 104 may be configured with omnidirectional antennae, directional antennae, or combinations thereof. The A wireless endpoint 102 may be disposed throughout the aircraft 100. As an example, the wireless endpoint 102 may be associated with a temperature sensor on the aircraft wing. The wireless access points 104 may be dispersed throughout the aircraft on the aircraft wing and the aircraft fuselage. The wireless endpoint 102 includes a directional antenna 103 that improves communications with one or more of the wireless access points 104 such that the wireless endpoint 102 can reduce transmission power. Indeed, power consumption of wireless endpoints 102 may be reduced to improve energy consumption of the aircraft 100 or batteries.

Figure 2:
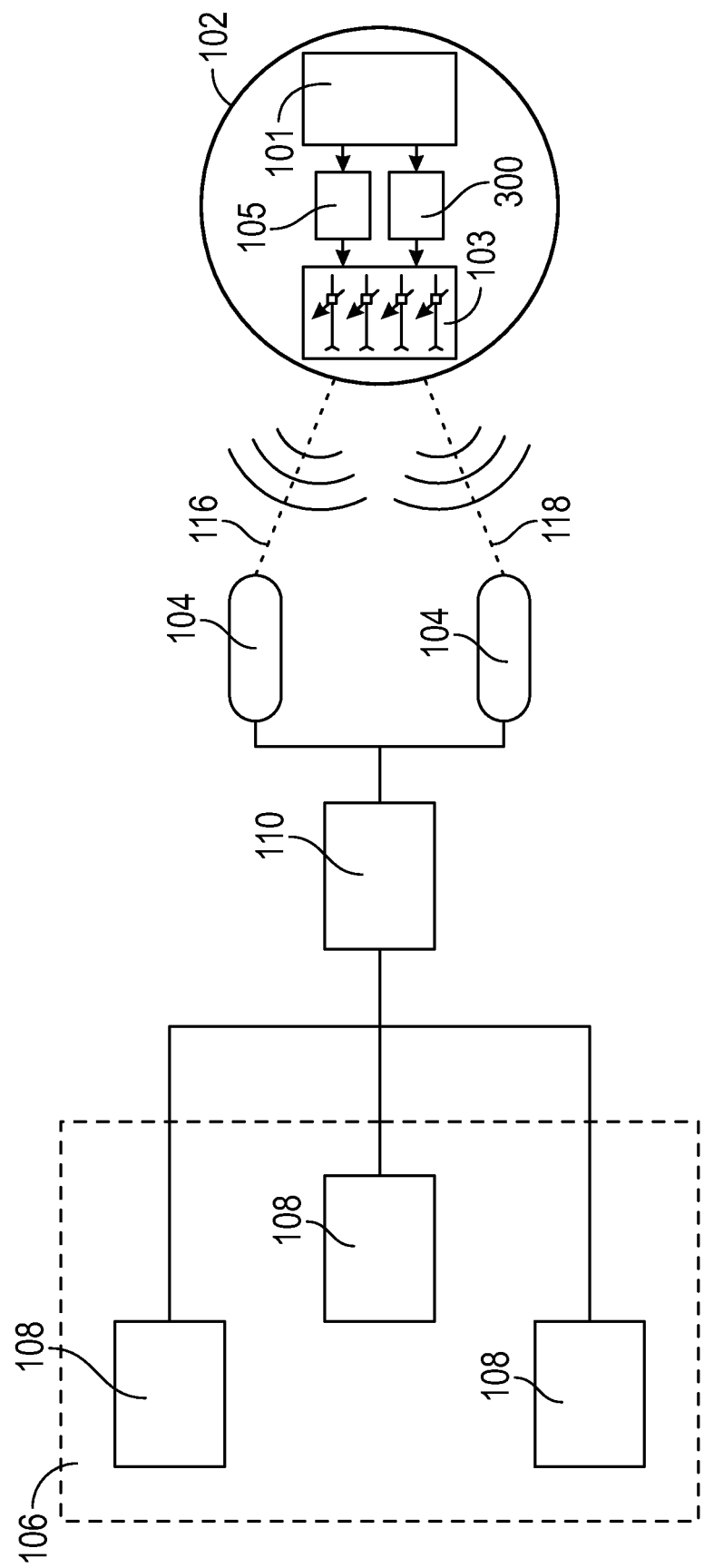
FIG. 2 illustrates an example architecture of a wireless communications system.

Turning to FIG. 2, a network architecture is shown in accordance with one ore more implementations of the present disclosure. The network architecture includes the wireless endpoint 102 and wireless access points 104. The wireless endpoint 102 includes the direction antenna 103. It should be appreciated that the directional antenna 103 may be any type, including parabolic antennas, phase array antennas, and the like. The wireless endpoint 102 may include a radio module 105 for packetization and organization of data communications. The wireless endpoint 102 may include an orientation controller 300. As discussed with regard to FIG. 3 the orientation controller 300 may control an orientation of the directional antenna 103. Those versed in the art will readily appreciate that the orientation may be mechanical with regard to a parabolic antenna, electromagnetic with regard to a phased array, or another implement. As one non-limiting example, the wireless endpoint 102 is configured to communicate with the wireless access points 104 over a first communications path 116 between a first one of the wireless access points 104 and the wireless endpoint 102. As another non-limiting example, the wireless endpoint 102 is configured to communicate with the wireless access points 104 over a second communications path 118 between a second one of the wireless access points 104 and the wireless endpoint 102. The wireless access points 104 may be associated with a network manager 110. The network manager 110 may be a router or a dynamic host configuration protocol (DHCP) server configured to establish and route communications between the wireless access points 104 and flight controls 106. The flight controls 106 may include different endpoint controllers 108 (e.g., integrated health management, prognostic health management, engine health management).

Figure 3:
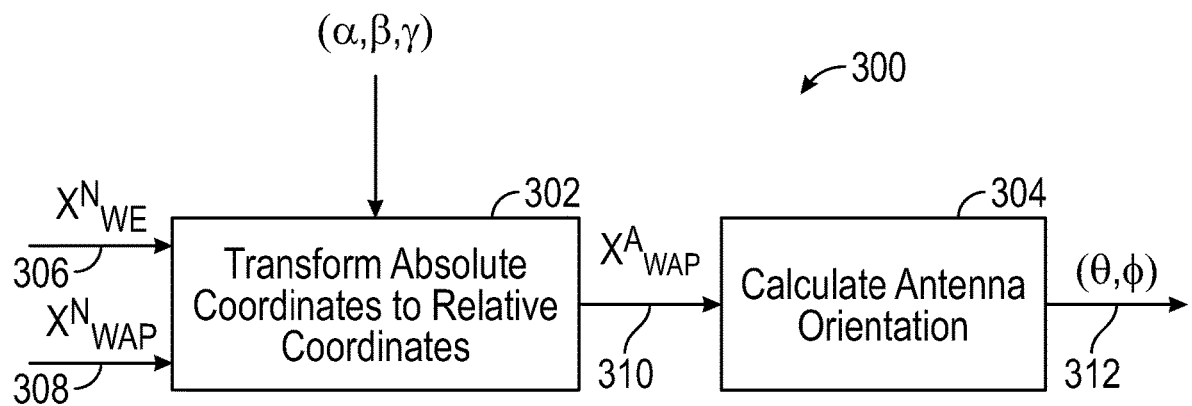
FIG. 3 illustrates an example transfer function associated with orienting a directional antenna.

Referring to FIG. 3, a portion of an orientation controller 300 in accordance with one or more implementations of the present disclosure is shown. The orientation controller may be disposed on the wireless endpoint 102, in communication with the wireless endpoint 102, or a combination thereof. The orientation controller 300 may receive absolute wireless access point coordinates 308 that define a wireless access point position respective the aircraft 100 or another point of origin. The orientation controller 300 may receive absolute wireless endpoint coordinates 306 that define a wireless endpoint position respective the aircraft 100 or another point of origin. The orientation controller 300 may comprise a transform 302 or computational implement that converts the absolute wireless access point coordinates 308 and absolute wireless endpoint coordinates 306 into relative coordinates 310 for orienting the directional antenna 103. That is, the absolute wireless access point coordinates 308 and absolute wireless endpoint coordinates 306 may be used to determine relative coordinates 310 that define a position of the wireless endpoint 102 with respect to respective wireless access point positions. The relative coordinates 310 may be used to determine an estimated orientation coordinates 312 of the directional antenna 103 in function block 304. As such, the directional antenna 103 may be oriented in an angle that is directed toward one of the wireless access points 104 at a time.

Figure 4:
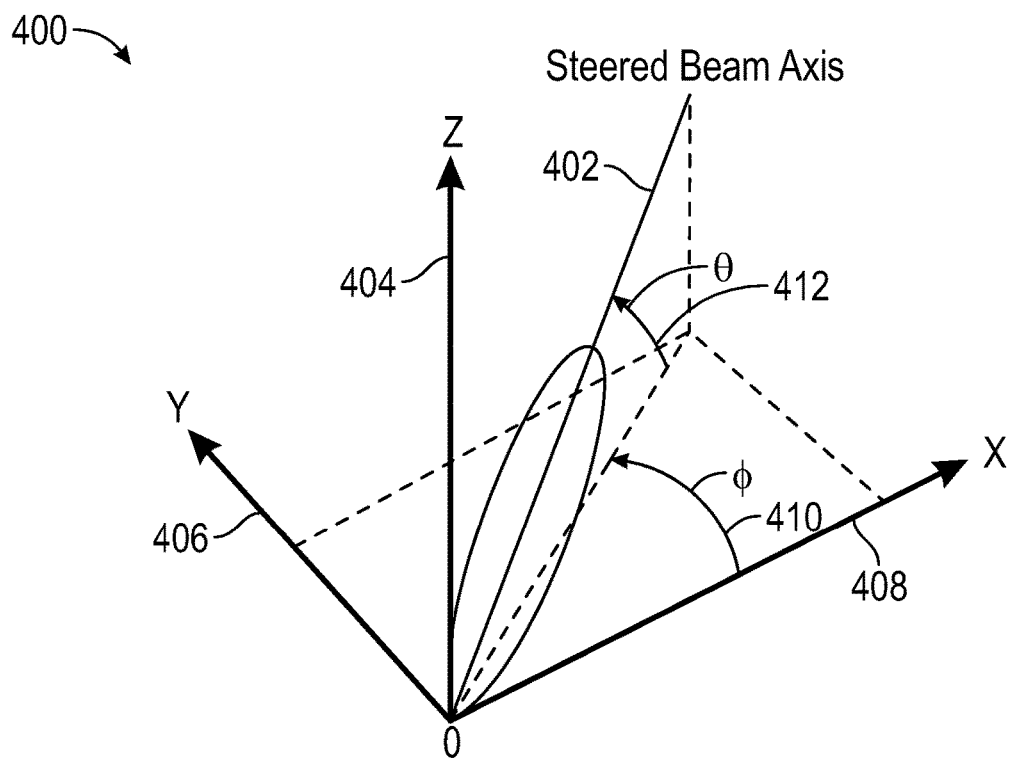
FIG. 4 illustrates an example an example coordinate system associated with an aircraft.

Turning to FIG. 4, a coordinate system 400 with orientational angles is shown in accordance with one or more implementations of the present disclosure. As shown, coordinates are given with respect to the origin (O). The origin may be a position on the aircraft 100 for defining the absolute coordinates of the wireless endpoints 102 and the wireless access points 104. The origin may be the wireless endpoints 102 or the wireless access points 104 for determination of the relative coordinates 310. The coordinates may three-dimensional, including an x-axis 408, y-axis 406, and z-axis 404. A directional antenna orientation 402 of the directional antenna 103 corresponds with coordinates 410, 412 of the orientation coordinates 312.

Figure 5B:
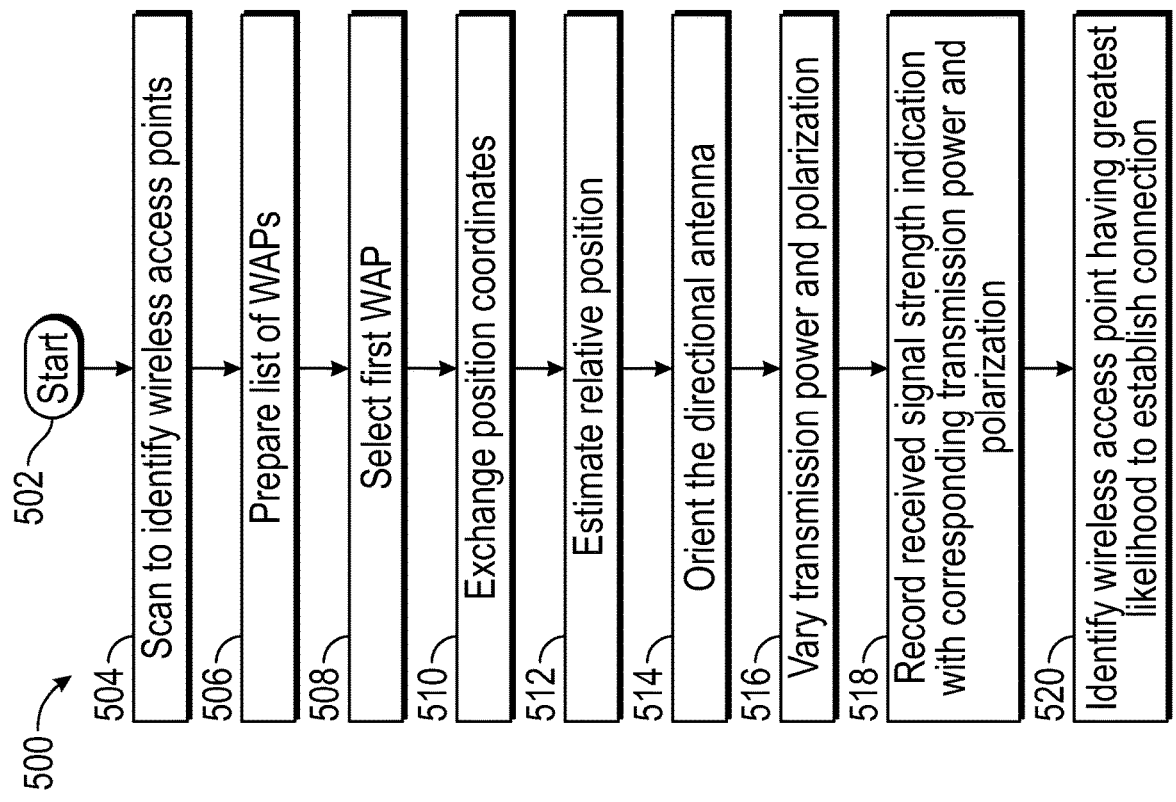
FIG. 5B illustrates an example process associated with establishing communications within wireless communications system.
Figure 5A:
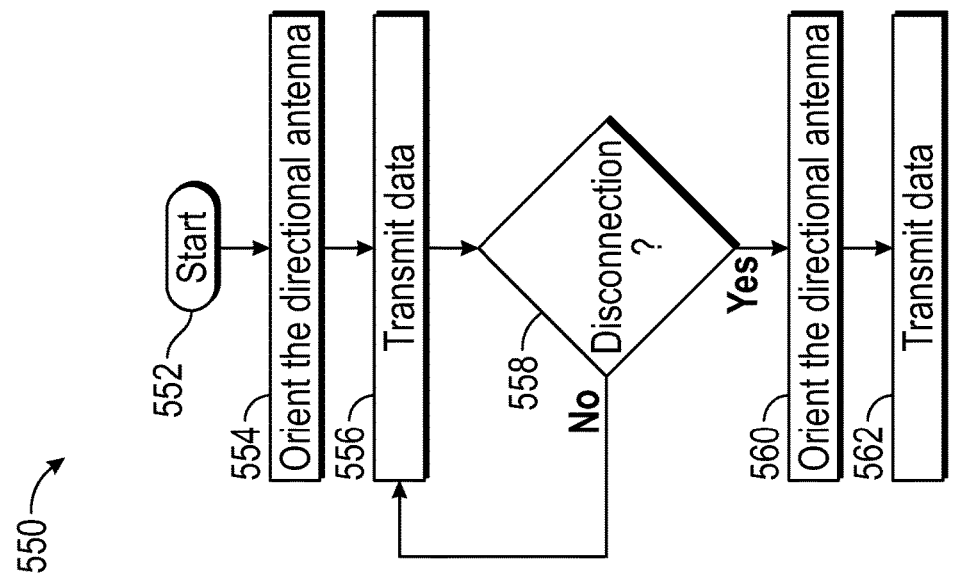
FIG. 5A illustrates an example process associated with analyzing a wireless communications system.

Referring to FIG. 5A, portions of an example process 500 associated with analyzing a wireless communications system in accordance with one or more implementations of the present disclosure is shown. It should be appreciated that all processes disclosed herein may include a step-by-step disclosure of the implementation and steps may be added, omitted, or rearranged as necessary. The steps may be further performed in series or in parallel. The process 500 begins in step 502. The process 500 may be performed during installation or manufacture. The process 500 may be performed during operation or in-flight for update or confirmation. In step 504, the wireless endpoint 102 scans to identify wireless access points 104.

A list of wireless access points 104 is prepared in step 506. In step 508, the first wireless access point 104 is selected by the wireless endpoint 102. In step 510, absolute wireless access point coordinates 308 and absolute wireless endpoint coordinates 306 may be exchanged between the wireless access point 104, and the wireless endpoint 102. It should be appreciated that the wireless access point 104, the wireless endpoint 102, or both may include predefined absolute wireless access point coordinates 308 and absolute wireless endpoint coordinates 306. In step 512, the relative coordinates 310 may be determined by transform 302.

In step 514, the directional antenna 103 is oriented to the directional antenna orientation 402. In step 516 and the following steps, test signals are sent to the wireless access points 104 including varying the power transmission level to determine a minimum transmission power required to establish communications with the wireless access point 104 without dropping packets or a communication path. Polarization of electromagnetic waves from the wireless endpoint 102 may be adjusted to left or right circular polarization, or any other polarization or strength for that matter, to determine the best communication parameters. The reflective properties of the directional antenna 103 may further distort polarization that may require different polarization levels to be evaluated. The directional antenna 103 may be oriented within an offset band, offset from the estimated orientation coordinates 312 to determine the minimum transmission power necessary to establish the communications paths 116, 118. That is, a step size associated with the directional antenna orientation 402 may adjust the directional antenna orientation 402 within a band that includes the estimated orientation coordinates 312. The band may shift based on (RSSI) from the wireless access point 104. As an example, if the RSSI is increasing along a trajectory, a controller 101 associated with the directional antenna 103 will continue in such a direction until the maximum RSSI is found. The RSSI may be sent from the wireless access points 104 as a data transmission (e.g., packets including the numerical value of the RSSI).

The controller 101 associated with the wireless endpoint 102 may include any combination of processors, field programmable gate arrays (FPGA), or application specific integrated circuits (ASIC). The controller 101 may include memory, volatile and non-volatile, operable to store machine and controller instructions from the processors and other processing mechanisms to receive, calculate, and control devices, as necessary. Machine instructions may be stored (e.g., stored instructions, stored machine instructions, stored steps) in any language or representation, including but not limited to machine code, assembly instructions, C, C++, C#, PASCAL, COBAL, PYTHON, JAVA, and RUBY to form a controller program product. It should be appreciated that any type of wired or wireless configuration is appreciated for any of the communications from the controller 101. Wireless protocols such as ZIGBEE, WI-FI, BLUETOOTH, or any other implement may be used. Communications may be realized through any protocol or medium known or unknown. It should be appreciated that the wireless communications disclosed herein may include any protocols (e.g., 802.11), mediums, or components for communicating. The controller 101 may be associated with the directional antenna 103 by any number of actuators including electric motors.

In step 518, the RSSI, transmission power, and polarization settings—along with the orientation settings—is stored as database entries, as shown in FIGS. 7A-7B. Some of the parameters or settings may be omitted and other parameters and settings may be added.

After the wireless endpoint 102 has analyzed one or more of the wireless access points 104, the wireless endpoint 102 identifies the wireless access point 104 having the greatest likelihood to establish connection in step 520. The wireless access point 104 having the greatest likelihood to establish connection may further be the wireless access point 104 associated with a minimum transmission power, enabling higher likelihood establishment of the communication paths 116, 118 by an increased capacity to increase power transmission levels.

Referring to FIG. 5B, an example process 550 associated with establishing communications within wireless communications system is shown in accordance with one or more implementations of the present disclosure. In step 552, the process 550 beings. In step 554, the directional antenna 103 is oriented to improve transmission with a first wireless access point 104 to establish a first communication path 116. In step 556, data is transmitted between wireless access point 104 and the wireless endpoint 102, communicating a data signal. In step 558, the controller 101 or another implement determines whether a disconnection has occurred. The determination may be based on a loss of signal, dropped packets above a predetermined threshold, improper sequence numbering, or any other situation. In step 560, the directional antenna 103 is oriented to improve transmission with a second wireless access point 104 to establish a second communication path 118 responsive to the disconnection. In step 562, data is transmitted between wireless access point 104 and the wireless endpoint 102 over the second communication path 118. The process may continue, connecting to the highest likelihood connection based on the database entries to ensure continued communications between the wireless endpoint 102 and the wireless access point 104.

Figure 6:
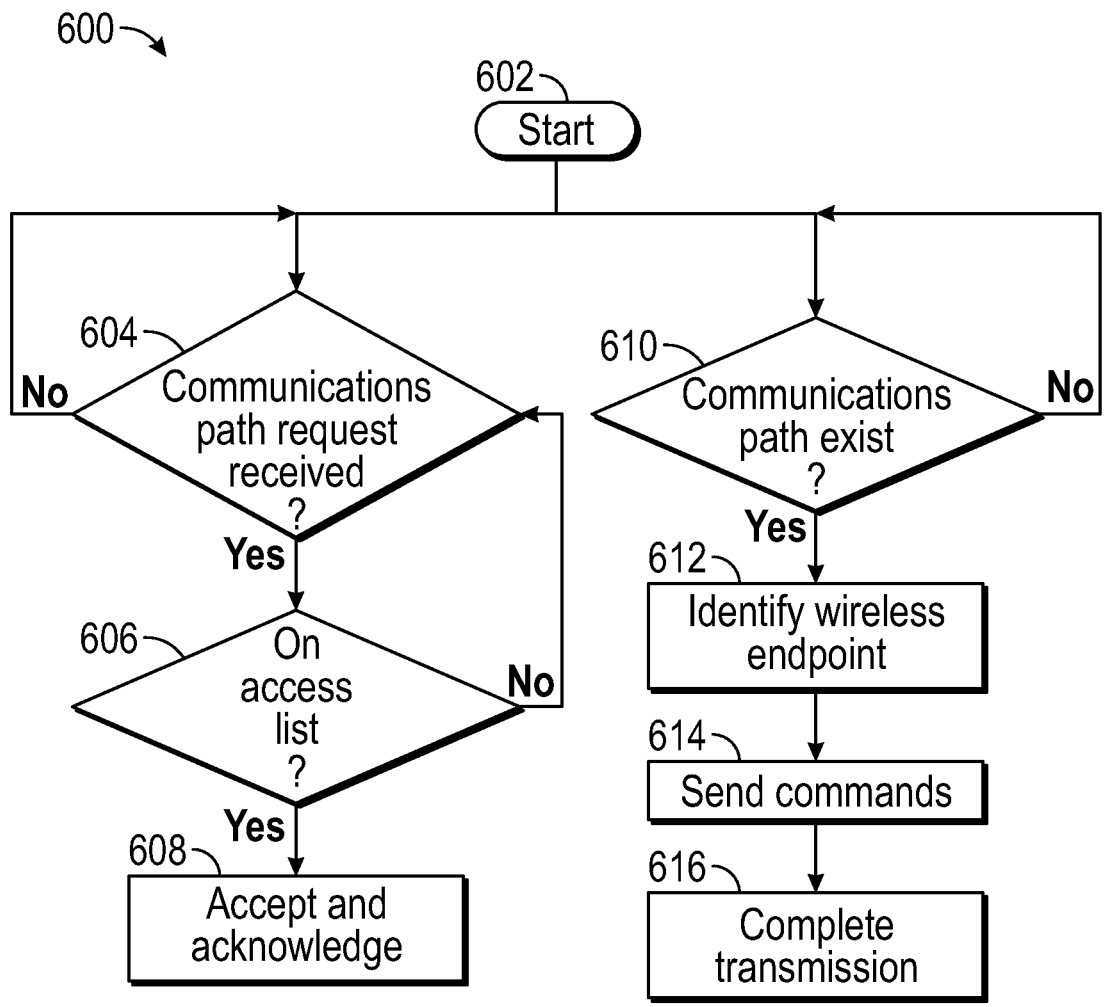
FIG. 6 illustrates a process associated with wireless communications.

Continuing with FIG. 6, a process 600 associated with wireless communications is shown in accordance with one or more implementations of the present disclosure. The wireless access points 104 or wireless endpoints 102 may use the process for parallel processing of access control and communications. In step 602, the process 600 begins. In step 604, if a communications path request is received, the wireless access point 104 determines whether the wireless endpoint 102 is on the access list in step 606. If the wireless endpoint 102 is on the access less in step 606, the wireless access point 104 accepts and acknowledges the communications in step 608.

In step 610, the wireless access point 104 determines whether a communications path exists. If the communications paths 116, 118 exist the wireless access point 104 identifies the wireless endpoint 102 in step 612. If commands are requested to be sent or received, the wireless access point 104 or wireless endpoint 102 sends the commands in step 614. In step 616, the transmission is completed and acknowledged.

Now turning to FIGS. 7A-7B, database schemas 700, 750. It should be appreciated that the database schemas 700, 750 may be implemented on a digital storage device as data structures. The data structures may include keys to identify information and information locations. The data structures may be aggregated to relate to one or more wireless access points 104 and wireless endpoints 102. Database schema 700 includes an index database entry in column 702 of the wireless endpoint 102 and associated wireless access points 104 that have been identified and analyzed or that are waiting analysis in column 704. Column 706 includes database entries of directional antenna orientations 402. In column 708, transmission power database entries are stored of the signal sent from the wireless endpoint 102 corresponding with the directional antenna orientations 402. In column 710 polarizations (circular or otherwise) are stored as database entries. In column 712 average RSSI from the wireless access point 104 is stored as a database entry.

Database schema 750 includes a listing 752 of the wireless endpoints 102 and the primary and secondary wireless access points 104 associated therewith pertaining to a first greatest likelihood of connection and a second greatest likelihood of connection in column 754. The wireless access points 104 may be associated wireless endpoints 102 through a ratio of the transmission power and the average RSSI received, as stored in columns 758 and 762. Also included is the respective directional antenna orientation 756 and the associated polarization in column 760.

Those versed in the art will appreciated that the wireless endpoints 102 disclosed herein may improve communication range. Hence, depending upon the spatial distribution of the WAPs 104 within the aircraft 100, the wireless endpoints 102 may be installed more sporadically throughout the aircraft 100. This may help to reduce the overall network design cost and aircraft weight, while maintaining the adequate performance.

The terminology used herein is for the purpose of describing the features associated with the present disclosure and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to features and parts, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to any particular features or parts disclosed as the best mode contemplated for carrying out this present disclosure, but that the present disclosure will include all that falls within the scope of the claims.

What is claimed is:

1. A method for initializing wireless communications in an aircraft, the method comprising:
receiving absolute wireless access point coordinates from wireless access points that define respective wireless access point positions of the wireless access points;
orienting a directional antenna to orientations based on the absolute wireless access point coordinates, the directional antenna being associated with a wireless endpoint;

transmitting test signals to the respective wireless access points while the directional antenna is positioned at the orientations to generate database entries associated with the respective wireless access point positions;

orienting the directional antenna according to a first one of the database entries having a first likelihood to establish a first communications path between a first one of the wireless access points and the wireless endpoint that is greater than a likelihood associated with another of the database entries; and transmitting a data signal to the first one of the wireless access points with a minimum transmission power based on the database entries.

2. The method of claim 1, further comprising responsive to a disconnection of the first communications path, orienting the directional antenna according to a second one of the database entries having a second likelihood to establish a second communications path between a second one of the wireless access points and the wireless endpoint that is greater than a likelihood associated with another of the database entries.

3. The method of claim 2, wherein the disconnection of the first communications path includes a dropped packet associated with the first communications path.

4. The method of claim 1, wherein the orienting the directional antenna of the wireless endpoint based on the absolute wireless access point coordinates is according to relative coordinates defined by the absolute wireless access point coordinates and absolute wireless endpoint coordinates that define a wireless endpoint position of the wireless endpoint.

5. The method of claim 4, wherein the orientations are all positions within an offset band having a step size that corresponds with the relative coordinates.

6. The method of claim 4, wherein the database entries are ratios of received signal strengths and transmission powers corresponding to the absolute wireless access point coordinates and the first likelihood is based on the ratios.

7. The method of claim 6, wherein the directional antenna is an antenna apparatus that produces the ratios according to the relative coordinates such that the ratios vary based on the relative coordinates.

8. The method of claim 6, wherein the received signal strengths are received from the respective wireless access points as a data transmission.

9. The method of claim 1, wherein the test signals are defined by combinations of transmission strength and polarization that vary at the orientations.

10. The method of claim 9, wherein the database entries are further defined according to the polarization.

11. A method for positioning a directional antenna associated with a wireless endpoint according to database entries, the method comprising:

orienting the directional antenna according to a first one of the database entries having a first likelihood to establish a first communications path between a first one of wireless access points and the wireless endpoint that is greater than a likelihood associated with another of the database entries;

transmitting a data signal to the first one of the wireless access points with a minimum transmission power based on the database entries; and responsive to a disconnection of the first communications path, orienting the directional antenna according to a second one of the database entries having a second likelihood to establish a second communications path between a second one of the wireless access points and the wireless endpoint that is greater than a likelihood associated with another of the database entries, wherein the database entries are ratios of received signal strengths and transmission powers corresponding to absolute wireless access point coordinates and the first likelihood is based on the ratios.

12. The method of claim 11, wherein the database entries are defined by a method for initializing wireless communications in an aircraft by recording the database entries for wireless communications in a database schema comprising:

receiving absolute wireless access point coordinates from wireless access points that define respective wireless access point positions of the wireless access points;

orienting the directional antenna to orientations based on the absolute wireless access point coordinates; and transmitting test signals to the wireless access points while the directional antenna is positioned at the orientations to generate the database entries for the wireless access point positions.

13. The method of claim 11, wherein the disconnection of the first communications path includes a dropped packet associated with the first communications path.

14. The method of claim 11, wherein the directional antenna is an antenna apparatus that produces the ratios according to the absolute wireless access point coordinates such that the ratios vary based on the absolute wireless access point coordinates.

15. The method of claim 11, wherein the received signal strengths are received from the respective wireless access points as a data transmission.

* * * * *